Patented Aug. 11, 1953

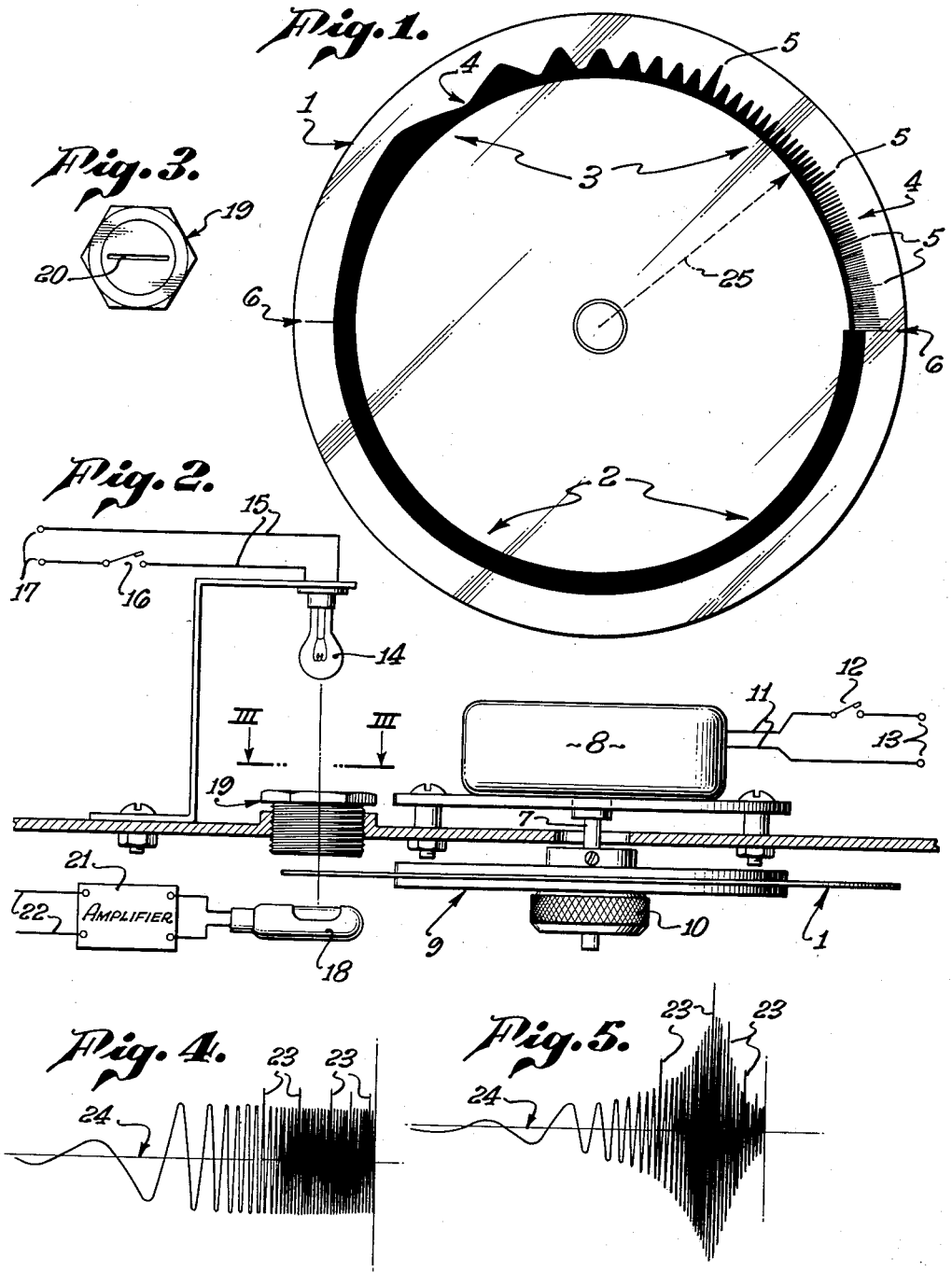

2,648,782

UNITED STATES PATENT OFFICE 2,648,782

AUDIO SWEEP FREQUENCY GENERATOR

George A. Argabrite, North Hollywood, Calif., assignor, by mesne assignments, to Pacific Transducer Corporation, Los Angeles, Calif., a corporation of California Application June 25, 1949, Serial No. 101,349

9 Claims. (Cl. 250—219)

This invention relates generally to a sweep frequency generator for generating signals for testing electrical circuits. More particularly it relates to a device which continually generates currents having continuously and repetitively varying frequencies which may substantially cover the audible range, such frequencies being adapted to be visually reproduced as on a screen of a cathode ray oscilloscope to indicate attenuation, resonance, and other electrical characteristics of the circuit under test.

In electrical communication circuits, as found in and in connection with such devices as microphones, loud speakers, amplifiers and filter networks, it is of importance to determine the circuit's response to all frequencies within the audible range. Several methods have been developed in the past to accomplish this purpose. One of the earliest was to impress the output of an adjustable frequency oscillator on the circuit and measure the circuit's output by means of a suitable meter or cathode ray oscilloscope. By selectively adjusting the frequency of the oscillator over the range desired to be tested and by noting responses at the several frequencies, a set of data could be obtained yielding a number of points from which a curve of responses against frequency might be plotted. The time consumed in such a procedure led to the development of a system in which the frequency output of the oscillator was continually varied as by electric motor means over the desired range. Such prior systems have been relatively complicated, subject to error, and expensive.

The present invention, used in conjunction with an instantaneous voltage or current measuring device such as an oscilloscope, produces an immediately visible indication of the performance of the tested circuit for all frequencies within the desired range. Photographic apparatus, well known in the art, may be used to obtain a record of a circuit's performance as indicated by the oscilloscope.

The continuously varying frequencies produced by my invention are generated in the output circuit of a photocell by modulating the light beam falling on the photocell. Modulation is accomplished by the rotation of a disc on which there has been photographically reproduced a series of alternate transparent and opaque sections constituting a variable area type of recording of frequencies progressively covering the desired range.

An object of my invention is therefore to disclose an improved type of sweep frequency generator.

Another object is to disclose a signal generator continuously and repetitively generating currents covering a desired frequency range.

A further object is to disclose a signal generator adapted to provide, in conjunction with an oscilloscope, an instantaneous indication of the performance of the circuit for all frequencies within the desired range.

Other and allied objects will be apparent to those skilled in the art from a study of the description and figures herewith.

To facilitate understanding, reference will be made to the following drawings in which:

Fig. 1 is a plan view of a disc as used in my generator.

Fig. 2 is an elevation, partly diagrammatic, of a complete sweep frequency generator.

Fig. 3 is a view, taken on lines III—III of Fig. 2, showing the light-limiting means.

Fig. 4 is an oscillogram showing a signal produced by the generator.

Fig. 5 is an oscillogram of the output of a typical circuit being tested.

Fig. 1 illustrates one form of disc I used in my invention. In the operative disc the areas shown in black in the drawing are actually transparent while the white areas are actually opaque; they have been reversed for presentation here in the interest of clarity. In the drawing the lower half of the disc, shown generally at 2, is unmodulated, and is designed to produce a signal in the output current which may be used as a base line in the finished indication or oscillogram as described and illustrated in detail hereinafter.

The upper half of the disc, shown generally at 3, includes the modulated portion. The illustration shows modulations 4 comprising a particular embodiment of my invention designed to produce virtually sinusoidal output frequencies from 40 cycles to 10 kilocycles per second when the disc is rotated at 600 R. P. M. It is obvious that the shape of the modulations 4 may be varied for different output wave forms; for instance, triangular or square wave forms of varying frequencies may be generated if desired.

For convenience and accuracy in measuring the performance of a circuit under test, the modulated portion 3 of the disc I has been provided with marker pips 5. Their use will be pointed out hereinafter; in the particular embodiment shown in Fig. 1, pips are at 1, 3, 5, 7 and 9 kc. In addition, two synchronizing pulses per revolution are provided by synchronizing pips 6 diametrically opposite each other on the disc I.

Referring in detail to Fig. 2, disc I is mounted on shaft 7 of synchronous motor 8. A pair of stiffening means 9 which may be circular pieces of thin metal serves to reinforce disc 1 during rotation. A knurled nut 10 is threaded on the end of shaft 7 for convenience in changing discs. The synchronous motor is connected by leads 11 through switch 12 to any convenient alternating current power source at terminals 13. The light source 14 may be connected by leads 15 through switch 16 to a convenient source of power at terminals 17. The lamp is preferably excited by direct current in order to avoid introducing an A. C. hum component into the output signal of the generator. Light is arranged to fall on photosensitive element 18, which may be a photocell or phototube of any well known type.

The quantity of light falling on photocell 18 will be determined by the instantaneous position of disc 1. Also in the path of the light beam is light-limiting means 19, shown in plan view in Fig. 3, wherein slit 20 permits a narrow beam of light to be transmitted to the disc and to the photocell. The slit is positioned with its longitudinal dimension radial with respect to disc 1. Within limits imposed by the laws of diffraction, the narrower this slit the more nearly the modulating waves 4 will govern the instantaneous amount of light falling on photocell 18, and hence the more nearly the output current of photocell 18 will reproduce the wave form on disc 1. However, a very narrow slit presents mechanical difficulties of construction, and I have found a width of slit of 0.005 inch to be satisfactory.

The output current of photocell 18 is amplified by suitable amplifier means shown generally at 21, and may be fed from output terminal 22 to suitable oscilloscope or oscillograph means not shown.

Fig. 4 is an oscillogram showing the output signal of my invention. On the left side of the oscillogram are the low frequency modulations increasing to the higher frequencies at the right side. The marker pips 23 resulting from marker pips 5 on disc 1 are clearly visible and serve to calibrate the oscillogram in terms of frequency. The base line 24 extending the entire width of the oscillogram serves as a calibration means in terms of attenuation and resonance. It can be seen from the uniform amplitude of the wave forms in Fig. 4 that neither resonance nor attenuation has occured at any of the frequencies within the range covered.

Fig. 5 is an oscillogram of the performance of a simple inductance-capacitance circuit on which has been impressed the output of my signal generator. Marker pips 23 and base line 24 are evident and it is seen that resonance is occurring at 3,000 cycles per second as indicated by the 3 kilocycle marker pip at the peak of the resonance.

It is evident that base line 24 generated by the unmodulated half 2 of disc 1 is included for the convenience of the viewer and may be omitted without departing from the spirit of the present invention. For instance, the entire surface of disc 1 may be used for modulating purposes, thereby omitting the advantage of the base line but gaining a wider frequency range. When the base line is used, it is obvious that no saw-tooth sweep circuit in the oscilloscope is necessary since the base line may be traced in a direction opposite to that traced by the modulated waves.

The disc used in my invention has been made as follows: a drawing on a large scale is made of the wave form desired, projected onto a circular base line. The drawing is photographically reduced to the size desired for use in the signal generator, and a positive is made from the negative thus obtained. Negatives in quantity may then be made from the positive. Because of certain errors introduced by photographic reproduction it is necessary to compensate in the original drawing for the factor known as "image spread." Image spread is the tendency for an exposed portion of an emulsion to affect the immediately adjacent unexposed emulsion. It is a boundary condition. If not corrected, image spread would produce a small amount of harmonic distortion and would slightly lower the amplitude of the high frequency signal. I prefer to use a disc having a diameter of 5 inches photographically reduced from an original drawing having a diameter of 48 inches, and I have found that the effect of image spread may be compensated by making the black surfaces of the original drawing approximately 0.022 inch larger than theoretically required. In other words, a narrow, black border 0.022 inch wide is added to the outline of all wave forms as plotted on the 48" diameter disc.

It will be noted in Fig. 1 that the amplitude of the modulating waves 4 is greater at higher frequencies than at lower. This is made necessary by two factors which become important at the higher frequencies. First, gas filled photocells are characterized by a slight time lag between stimulus and response. Although negligible at low frequencies, the lag becomes great enough in the higher audio range to require compensation. Second, since for practical reasons the slit must have a finite width instead of the infinitely narrow width theoretically desirable, the amount of light falling on the photocell will be equal to an integration over an appreciable width of the beam passing through the disc.

The two factors described are cumulative in effect and can be compensated by providing modulating waves on the disc of progressively greater amplitude at progressively higher frequencies. I have found that an increase in amplitude of approximately 5% per 1000 cycles on the disc is sufficient to generate waves in the photocell of substantially constant amplitude.

Inner radius 25 of modulated portion 3 of disc 1 is progressively increased at higher frequencies in order to maintain a constant average light intensity falling on the photocell. If said radius were not thus corrected the image would be displaced upward on the right of the viewing screen thereby making the image less easy to interpret.

The description and illustration herein are exemplary only and are not intended to limit the scope of the present invention which is to be interpreted in the light of the appended claims.

I claim:

1. In a sweep frequency generator having a source of light and photosensitive means responsive to light therefrom, the provision of: modulating means in the path of light impinging said photosensitive means, said modulating means being movable at constant speed relative to said path and including a series of alternate opaque and transparent sections constituting a variable area type of recording, the time interval between the arrival of successive opaque and transparent sections at said path being progressively diminished from one end of said series to the other end thereof.

2. A device of the character stated in claim 1 wherein the amplitude of said opaque and transparent sections progressively increases as said time interval diminishes.

3. A device of the character stated in claim 1 including a plurality of calibrating pips, one of said pips being superimposed on each of a plurality of selected sections in said series.

4. A device adapted to be continuously moved at constant speed substantially transversely to a light path for modulating the light in said path, said device including a series of alternate opaque and transparent sections constituting a variable area type of recording, the time interval between the arrival of successive opaque and transparent sections at said path being progressively diminished from one end of said series to the other end thereof.

5. A device of the character stated in claim 4 wherein the transparent area, integrated over a plurality of sections, is substantially constant throughout said series.

6. In a sweep frequency generator having a light source and photosensitive means responsive to light therefrom, the provision of: a disc adapted to be rotated at constant speed in the path of light impinging said photosensitive means, said disc bearing thereon a series of alternate transparent and opaque sections constituting a variable area type of recording, the time interval between the arrival of successive opaque and transparent sections at said path being progressively diminished from one end of said series to the other end thereof.

7. A device of the character stated in claim 6 wherein said series extends semicircularly of the disc, and the disc includes a semicircular unmodulated transparent portion.

8. A device of the character stated in claim 6 wherein the transparent area, integrated over a plurality of sections, is substantially constant throughout said series.

9. A device of the character stated in claim 6 including a plurality of calibrating pips, one of said pips being superimposed on each of a plurality of selected sections in said series.

GEORGE A. ARGABRITE.

References Cited in the file of this patent

UNITED STATES PATENTS

| Number | Name | Date |
|---|---|---|
| 1,176,147 | Keen | Mar. 21, 1916 |
| 1,880,105 | Reifel | Sept. 27, 1932 |
| 2,169,842 | Kannenberg | Aug. 15, 1939 |
| 2,241,371 | Huxford | May 6, 1941 |
| 2,432,123 | Potter | Dec. 9, 1947 |
| 2,473,897 | Miller | June 21, 1949 |
| 2,514,284 | Le Page | July 4, 1950 |